(12) United States Patent
Homyk et al.

(10) Patent No.: US 12,136,501 B1
(45) Date of Patent: Nov. 5, 2024

(54) USING IONIC LIQUIDS TO MAKE RECONFIGURABLE LIQUID WIRES

(71) Applicant: Verily Life Sciences LLC, South San Francisco, CA (US)

(72) Inventors: Andrew Homyk, Belmont, CA (US); Saurabh Vyawahare, Mountain View, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 709 days.

(21) Appl. No.: 17/322,547

(22) Filed: May 17, 2021

Related U.S. Application Data

(62) Division of application No. 15/945,860, filed on Apr. 5, 2018, now Pat. No. 11,024,444.

(60) Provisional application No. 62/482,258, filed on Apr. 6, 2017.

(51) Int. Cl.
| | |
|---|---|
| H01B 7/00 | (2006.01) |
| B66C 13/12 | (2006.01) |
| F16L 25/01 | (2006.01) |
| H01B 1/02 | (2006.01) |
| H01B 1/12 | (2006.01) |
| H01B 7/04 | (2006.01) |
| H01B 13/00 | (2006.01) |
| H01R 4/60 | (2006.01) |

(52) U.S. Cl.
CPC .......... *H01B 7/0072* (2013.01); *B66C 13/12* (2013.01); *F16L 25/01* (2013.01); *H01B 1/02* (2013.01); *H01B 1/122* (2013.01); *H01B 1/124* (2013.01); *H01B 7/04* (2013.01); *H01B 13/0036* (2013.01); *H01R 4/60* (2013.01)

(58) Field of Classification Search
CPC .......... H01B 7/0072; H01B 1/02; H01B 1/22; H01B 1/24; H01B 7/04; H01B 13/0036; H01B 7/0081; H01B 7/00; H01B 7/009; H01R 4/60; B66C 13/12; F16L 25/01
USPC ....... 174/9 F, 8, 9 R, 33, 34, 68.1, 252, 256, 174/261; 29/592, 592.1
See application file for complete search history.

(56) References Cited

U.S. PATENT DOCUMENTS

| | | | |
|---|---|---|---|
| 7,438,832 B2 | 10/2008 | Majumdar et al. | |
| 8,362,358 B2 | 1/2013 | Hotte et al. | |
| 9,233,421 B2 | 1/2016 | Suh et al. | |
| 10,547,123 B2 | 1/2020 | Lazzi et al. | |
| 11,024,444 B1 * | 6/2021 | Homyk | H01B 7/0072 |
| 2009/0301297 A1 | 12/2009 | Littau | |

OTHER PUBLICATIONS

U.S. Appl. No. 15/945,860, Non-Final Office Action, Mailed On Nov. 13, 2020, 9 pages.
U.S. Appl. No. 15/945,860, Notice of Allowance, Mailed On Feb. 3, 2021, 8 pages.

(Continued)

*Primary Examiner* — Angel R Estrada
(74) *Attorney, Agent, or Firm* — Kilpatrick Townsend & Stockton LLP

(57) ABSTRACT

Disclosed herein are liquid conductive wires and methods for making and using the same. Liquid conductive wires can be used in flexible, reconfigurable, dynamic and transparent electronic devices. Liquid conductive wires can be used in a variety of systems including, but not limited to, soft robotics.

11 Claims, 2 Drawing Sheets

(56) References Cited

OTHER PUBLICATIONS

Elettro et al., "In-Drop Capillary Spooling of Spider Capture Thread", PNAS, vol. 113, No. 22, May 31, 2016, pp. 6143-6147.
Freemantle, "An Introduction to Ionic Liquids", Royal Society of Chemistry, ISBN 978-1-84755-161-0, Nov. 20, 2009, 2 pages.
Ghoshdastidar et al., "Ion-Water Wires in Imidazolium-Based Ionic Liquid/Water Solutions Induce Unique Trends in Densi", Soft Matter, Issue 12, Feb. 12, 2016, pp. 3032-3045.
Kim et al., "Soft Robotics: A Bioinspired Evolution in Robotics", Trends in biotechnology, vol. 31, Issue 5, May 2013, pp. 287-294.
Melin et al., "Microfluidic Large-Scale Integration: The Evolution of Design Rules for Biological Automation", Annual Review of Biophysics and Biomolecular Structure, vol. 36, Feb. 1, 2007, pp. 213-231.
Palleau et al., "Reversible Patterning and Actuation of Hydrogels by Electrically Assisted Ionoprinting", Nature Communications, vol. 4, No. 2257, Aug. 2, 2013, pp. 1-7.
Wang et al., "Gold-Ionic Liquid Nanofluids With Preferably Tribological Properties and Thermal Conductivity", Nanoscale Research Letters, vol. 6, Issue 1, Mar. 28, 2011, pp. 1-10.
Wehner et al., "An Integrated Design and Fabrication Strategy for Entirely Soft, Autonomous Robots", Nature, vol. 536, Aug. 24, 2016, pp. 451-455.

\* cited by examiner

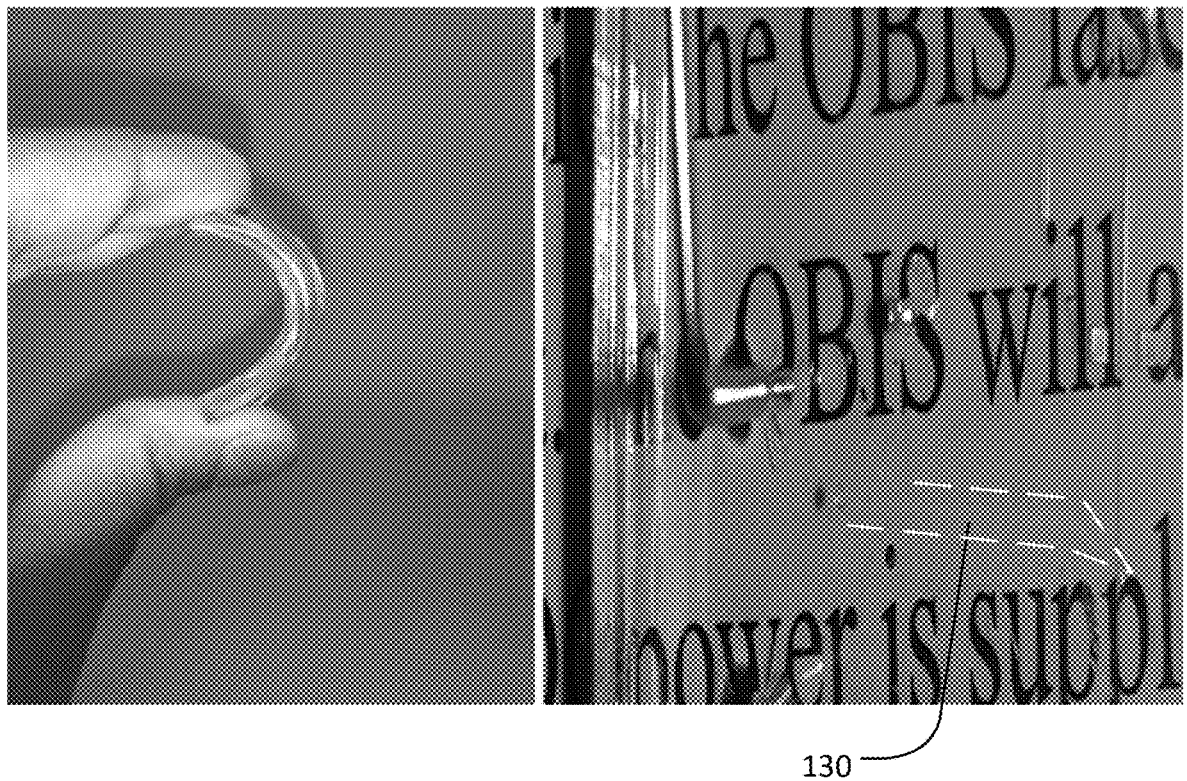
*Figure 2A*        *Figure 2B*

USING IONIC LIQUIDS TO MAKE RECONFIGURABLE LIQUID WIRES

CROSS-REFERENCE TO RELATED APPLICATIONS

The present application is a continuation of U.S. patent application Ser. No. 15/945,860, filed on Apr. 5, 2018, which claims priority to and filing benefit of U.S. Provisional Patent Application No. 62/482,258, filed Apr. 6, 2017, and titled "USING IONIC LIQUIDS TO MAKE RECONFIGURABLE LIQUID WIRES," the contents of which are incorporated herein by reference in their entirety.

BACKGROUND

Soft and flexible electronics is a rapidly progressing field. Incorporating circuitry and devices onto flexible substrates presents the challenge of providing equally flexible electronic components. It can be desirable to provide flexible wires that can survive a lifetime of bending and flexing.

SUMMARY

The term embodiment and like terms are intended to refer broadly to all of the subject matter of this disclosure and the claims below. Statements containing these terms should be understood not to limit the subject matter described herein or to limit the meaning or scope of the claims below. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a liquid conductive wire comprising: a first end; at least one additional end; and an ionic liquid, wherein the wire is configured to transfer electrical current/voltage from the first end to the at least one additional end and/or the at least one additional end to the first end.

In certain embodiments, the liquid wire may further comprise a body that partially or entirely contains the ionic liquid and the first and additional ends. The body can be flexible, rigid, semi-rigid, fluid, or any combination thereof. The body may comprise an elastomer, a polymer, a copolymer, a photopolymer, a fluoropolymer, a glass, a foam, a gel, a biological material, a granular material, a metal, an alloy, a clad metal, or any combination thereof.

Also, in certain embodiments, with or without a body, the liquid conductive wire can be at least partially contained within a channel. The channel can be fashioned as a plurality of channels. For example, in certain embodiments the channel may be configured as a two dimensional (2D) network of channels, a three dimensional (3D) network of channels, a reservoir, an inlet, an outlet, a source, a drain, or any combination thereof. The channel can be contained within the body. Or, in some embodiments, the channel may be an open air channel that is maintained and/or configured by electric or magnetic fields. In some embodiments, the wire may comprise a channel without a body.

The liquid conductive wire may comprise at least one of an ionic liquid, a liquid metal, an electrolyte, a conductive organic solution, a liquid solder, a conductive gel, a molten metal, or a combination thereof.

For example, the liquid conductive wire may comprise an ionic liquid comprising at least one of an ammonium-based ionic liquid, a choline-based ionic liquid, an imidazolium-based ionic liquid, a basionics-based ionic liquid, a phosphonium-based ionic liquid, a pyridinium-based ionic liquid, a pyrrolidinium-based ionic liquid, a sulfonium-based ionic liquid, 1-butyl-1-methylpiperidinium tetrafluoroborate, 1-butyl-1-methylpiperidinium bis(trifluoromethylsulfonyl)imide, 1-butyl-1-methylpiperidinium hexafluorophosphate, 1,2,3-tris(diethylamino)cyclopropenylium bis(trifluoromethanesulfonyl)imide, 1,2,3-tris(diethylamino)cyclopropenylium dicyanamide, or any combination thereof.

Additionally and/or alternatively, the liquid conductive wire may comprise a liquid metal chosen from a group consisting of solder, metal particles suspended in liquid, metal particles suspended in gel, and mercury, gallium, alloys of mercury or gallium, or any combination thereof. For example, in one embodiment, the liquid wire may comprise solder used to connect two pieces of metal.

Additionally and/or alternatively, the liquid conductive wire may comprise an electrolyte comprising at least one of sodium nitrate, sodium chloride, potassium nitrate, magnesium chloride, sodium acetate, copper sulfate, potassium chloride, magnesium nitrate, potassium nitrate, calcium chloride, lithium chloride, sodium carbonate, potassium carbonate, calcium carbonate, sodium bicarbonate, ammonium acetate, silver nitrate, ferric chloride, or any combination thereof.

Additionally and/or alternatively, the liquid conductive wire may comprise a conductive organic solution comprising at least one of a graphene suspension, a carbon nanotube suspension, a buckminsterfullerene ($C_{60}$) suspension, a conductive small molecule suspension, a ferroelectric fluid, a conductive liquid crystal, a conductive liquid polymer, a conductive monomer solution, or any combination thereof.

Also disclosed herein are methods of producing a liquid conductive wire. Such methods may comprise forming a body comprising an exterior and an interior; creating a channel in the body, the channel having at least a first end and at least one additional end; and emplacing an ionic liquid in the channel. The method of producing the liquid conductive wire can further include creating an inlet in the body, wherein the inlet exposes at least part of a channel disposed within the body to the exterior of the body; filling the channel with a conductive liquid via the inlet; and optionally sealing the inlet. In some further embodiments, producing liquid conductive wires can include polymerizing a body around the liquid conductive wires. For example, a conductive liquid can be suspended in a photopolymerizable monomer solution and the photopolymerizable monomer can be polymerized (i.e., ultraviolet light cured) encasing the conductive liquid providing a liquid conductive wire within a photopolymer body.

Producing liquid conductive wires can include reconfiguring the liquid conductive wires contained in a system. For example, in certain embodiments, producing the liquid conductive wire comprises reconfiguring at least one previously configured liquid conductive wire and/or at least one channel. For example, in certain embodiments, the method of reconfiguring the liquid conductive wire can include opening a fluidic valve in the channel and flowing a conductive liquid through the channel to create a wire. Additionally and/or alternatively, the method of reconfiguring the liquid conductive wire can include closing a fluidic valve in the channel to break liquid flow to at least part of the channel.

Additionally and/or alternatively, the method of reconfiguring the liquid conductive wire can include breaking a barrier in the channel and having liquid flow create a new or longer conductive channel. Additionally and/or alternatively, the method of reconfiguring the liquid conductive wire can include backfilling a channel with conductive liquid, wherein the backfilling allows air to diffuse out of the channel. Additionally and/or alternatively, the method of reconfiguring the liquid conductive wire can include flowing a non-conductive liquid into the channel to displace the conductive liquid. Additionally and/or alternatively, the method of reconfiguring the liquid conductive wire can include flowing a non-conductive liquid into the channel to partially displace the conductive liquid. Additionally and/or alternatively, the method of reconfiguring the liquid conductive wire can include deflecting a flow of the conductive liquid to form a new channel.

In certain embodiments, the reconfiguring provides a change in electrical current flow of the liquid conductive wire. In some aspects, the change in electrical current flow of the liquid conductive wire provides a sensory system.

The method of producing a liquid conductive wire, creating an inlet or an outlet, creating channels and otherwise preparing a body for implementation of liquid conductive wires may individually comprise the use of at least one of photolithography, wet etching, reactive ion etching, soft lithography, two-photon lithography, 3-D printing, forming the channel around a sacrificial template, milling, micromilling, embossing, extruding, vacuforming, injection molding, a damascene process, or combinations thereof.

Also disclosed herein are systems comprising liquid conductive wires, wherein a liquid wire is incorporated into a component of the system. Such systems may include, but are not limited to, a device, an electronic component, a robot, or a chemical compound (e.g., a medicament). In some examples, liquid wire can be part of a soft robotic device, a transparent liquid antenna, a transmitter, a self-healing fuse, a neuromodulator, a dynamically reconfigurable electronic device, a sensor, a pressure-driven circuit breaker, a wearable electronic device, a transparent electronic device, a contact lens, an implantable device, an implantable chemical sensor, an implantable neurostimulator, an intraocular corrective lens, a display device, a heating and cooling system, or combinations thereof.

In certain embodiments, liquid wires can be used in a soft robotic as interconnect circuitry or a hydraulic network, wherein the liquid conductive wires can function simultaneously as electronic conductor and hydraulic fluid.

Also described herein are systems that can include liquid wires disposed within and/or onto a flexible substrate to provide a flexible electronic device. The flexible electronic device can be resistor, a capacitor, a diode, a transistor, a memristor, a thermistor, a varistor and/or a triode. In some examples, a capacitor can be formed by disposing a dielectric material between a first liquid conductive wire and a second liquid conductive wire.

Also described herein are optical properties of systems according to exemplary embodiments. For example, the liquid conductive wire and body can be of a similar refractive index creating a transparent or translucent system.

BRIEF DESCRIPTION OF THE DRAWINGS

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 2A is a digital image exhibiting flexibility of poly (dimethylsiloxane) (PDMS) according to an embodiment described herein.

FIG. 2B is a digital image exhibiting transparency of ionic liquid electrodes embedded inside channels disposed in a PDMS substrate according to an embodiment described herein. Refractive index matching between the ionic liquid electrodes and the PDMS substrate provides transparent structures.

DETAILED DESCRIPTION

I. Overview

Figure 1:
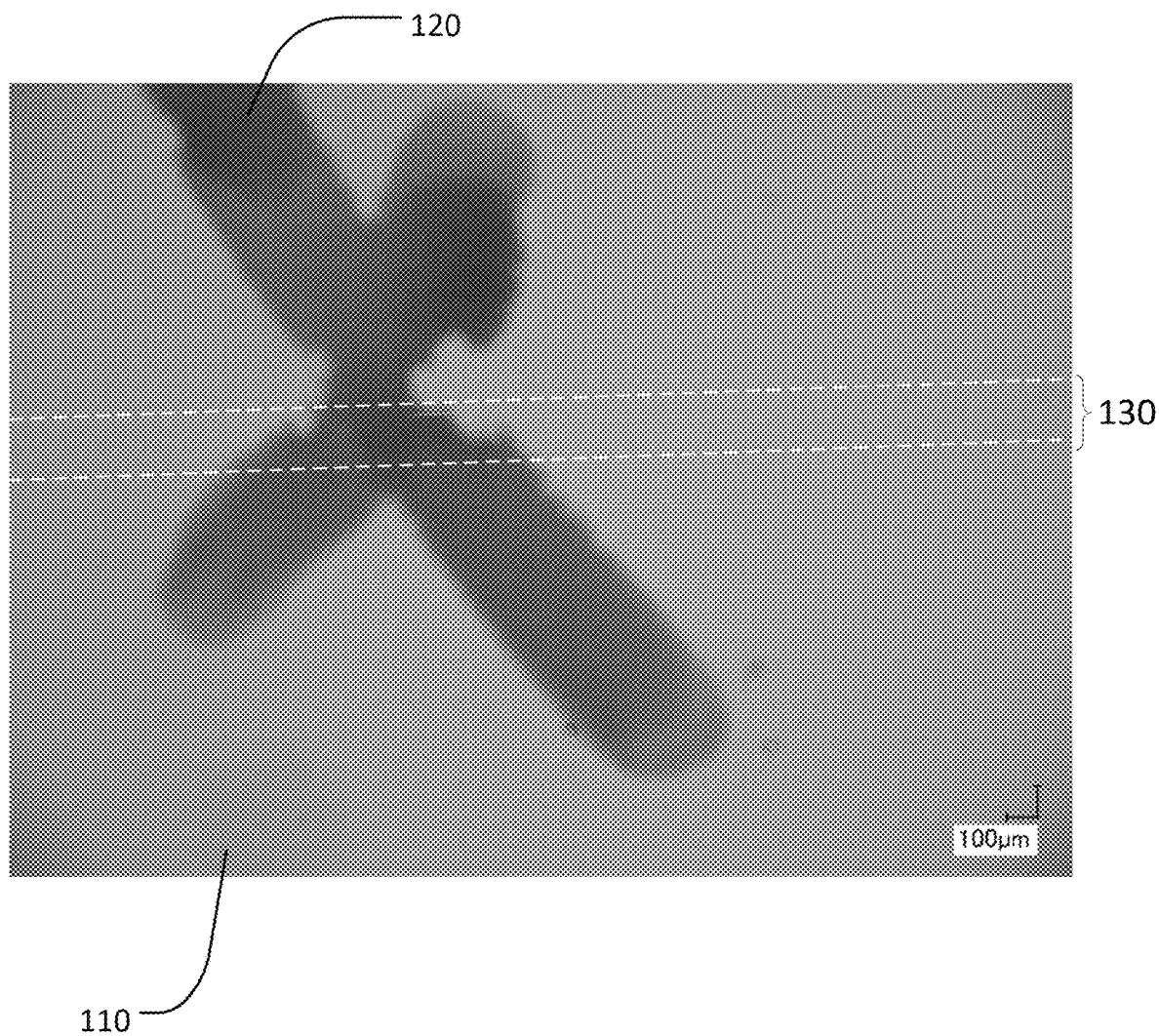
FIG. 1 is a digital image of a channel in a poly(dimethylsiloxane) (PDMS) body filled with an ionic liquid to form a liquid conducting wire. An "X" is drawn on a substrate to illustrate transparency.

Certain aspects and features of the present disclosure relate to electronics and specifically to wires. Disclosed herein are liquid wires capable of conducting electricity. Liquid wires can be formed by embedding conductive liquids in channels formed within a soft, semi-soft or rigid solid body. Optionally, liquid wires with or without a body, can be contained in open channels on a substrate (e.g., a circuit board). A plurality of channels can be combined to form a network. A plurality of bodies can be combined and/or added to external components to form a system. Further disclosed are methods of making such compositions and systems. It is noted that description embodiments described for compositions may also be incorporated in methods and/or systems and vice versa.

II. Definitions

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

Various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, an ionic liquid is a liquid compound containing mobile charged species or a liquid mixture containing mobile charged species.

As used here a wire is a material permitting electric current flow having a resistivity less than about $10^{16}$ ohm-meters ($\Omega \cdot m$).

As used herein a translucent material is a material wherein a fraction of impinging light diffracted above 2.5° of an incident angle (referred to as "haze") exceeds 30%. Such techniques are explained fully in the literature (e.g., Arie Ram, "Fundamentals of Polymer Engineering," Springer Science & Business Media (2013)).

As used herein a transparent material is a material wherein greater than 75% of ultraviolet light, visible light and near-infrared radiation (e.g., electromagnetic radiation having a wavelength from about 200 nm to about 2500 nm) can transmit through the transparent material. Such techniques are explained fully in the literature, such as, ASTM Standard D1003.

Other objects, advantages and features of the present disclosure will become apparent from the following specification taken in conjunction with the accompanying drawings.

III. Compositions

Disclosed herein is a liquid conductive wire comprising a first end and at least one additional end that can transfer electric current and/or voltage from the first end to the at least one additional end and/or the at least one additional end to the first end. For example, the wire may be configured to have just a first end and a second end. Or, the wire may be part of a network, as for example having a first end that branches into a second and third end, or a first and second end that meet in a central channel and then branch to a third and fourth end. Additionally and/or alternatively, the wire may be part of a three dimensional (3D) network, as for example having a first network connected to a second substantially parallel network by substantially perpendicular liquid conductive wire interconnects. Other networks are contemplated by the disclosure herein.

In certain embodiments, the liquid wire may further comprise a body that contains the ionic liquid and the first and additional ends. The body can be flexible, rigid, semi-rigid, fluid, or any combination thereof. The body may comprise an elastomer, a polymer, a copolymer, a photopo-lymer, a fluoropolymer, a glass, a foam, a gel, a biological material, a granular material, a metal, an alloy, a clad metal, or any combination thereof.

The liquid conductive wire, with or without a body, can be at least partially contained within a channel that is positioned on or in a substrate. In certain embodiments, the channel can be fashioned as a plurality of channels, a network of channels, a reservoir, an inlet, an outlet, a source, a drain, or any combination thereof. The channel can be contained within the body.

A variety of liquid conductive materials may be used. In some embodiments, the liquid conductive wire may comprise at least one of a liquid metal, an electrolyte, a conductive organic solution, a liquid solder, a conductive gel, a molten metal (e.g., in high temperature applications), or an ionic liquid. In some embodiments, suitable liquid metals may comprise at least one of solder, metal particles suspended in liquid, metal particles suspended in gel, and mercury, gallium, alloys of mercury or gallium, or any combination thereof. In some embodiments, suitable electrolytes may comprise at least one of sodium nitrate, sodium chloride, potassium nitrate, magnesium chloride, sodium acetate, copper sulfate, potassium chloride, magnesium nitrate, potassium nitrate, calcium chloride, lithium chloride, sodium carbonate, potassium carbonate, calcium carbonate, sodium bicarbonate, ammonium acetate, silver nitrate, ferric chloride, or any combination thereof. In some further embodiments, conductive organic solutions may comprise at least one of a graphene suspension, a carbon nanotube suspension, a buckminsterfullerene ($C_{60}$) suspension, a conductive small molecule suspension, a ferroelectric fluid, a conductive liquid crystal, a conductive liquid polymer, and a conductive monomer solution. In certain embodiments, ionic liquids may comprise at least one of an ammonium-based ionic liquid, a choline-based ionic liquid, an imidazolium-based ionic liquid, a basionics-based ionic liquid, a phosphonium-based ionic liquid, a pyridinium-based ionic liquid, a pyrrolidinium-based ionic liquid, a sulfonium-based ionic liquid, 1-butyl-1-methylpiperidinium tetrafluoroborate, 1-butyl-1-methylpiperidinium bis(trifluoromethylsulfonyl)imide, 1-butyl-1-methylpiperidinium hexafluorophosphate, 1,2,3-tris(diethylamino)cyclopropenylium bis(trifluoromethanesulfonyl)imide, 1,2,3-tris(diethylamino)cyclopropenylium dicyanamide, or any combination thereof. Or, other ionic liquids may be used. In some embodiments, ionic liquids are suitable conductors for low current/voltage applications.

In some examples, the ionic liquids may have a boiling point sufficiently high such that evaporation is negligible at room temperature (e.g., about 15° C. to about 40° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., or anywhere in between). In certain embodiments, ionic liquids can have a boiling point of at least 100° C., or 200° C., or 300° C. or greater, making ionic liquids and ionic liquid conductive wires resistant to evaporation at room temperature.

A variety of materials may be used for the body material. Suitable bodies can include an elastomer, a polymer, a copolymer, a photopolymer, a fluoropolymer, a glass, a foam, a gel, a biological material, a granular material, a metal, an alloy, a clad metal, or any combination thereof.

Also, the channel or body may be configured in a variety of shapes. Thus, the liquid wires disclosed herein may comprise a variety of cross-sectional shapes. The liquid wires can have a square shape, a rectangular shape, a triangular shape, a circular shape, an elliptical shape, or any suitable shape. In further embodiments, for example, the body can have any two dimensional (2D) cross-section and/or three dimensional (3D) shape. Thus, the body cross section can be a rectangle, square, circle, ellipse, polygon, parallelogram, triangle, any combination thereof, or any suitable shape. In a further example, the 3D shape can be a rectangular cuboid, a sphere, a cylinder, a toroid, a hyperbolic parabola, an ellipsoid, any combination thereof, or any suitable 3D shape.

The liquid wires disclosed herein may comprise a variety of sizes. Round wires can have a diameter of from about 1 nm to about 10 cm (e.g., about 50 nm to about 500 nm, about 5 cm to about 10 cm, about 500 nm to about 500 microns, about 50 mm to about 5 cm, or about 1 nm to about 100 nm). For example, round wires can have a diameter of about 1 nm, 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 5 mm, 10 mm, 20 mm, 30 mm, 40 mm, 50 mm, 60 mm, 70 mm, 80 mm, 90 mm, 1 cm, 2 cm, 3 cm, 4 cm, 5 cm, 6 cm, 7 cm, 8 cm, 9 cm, 10 cm, or anywhere in between.

IV. Methods

Also disclosed herein are methods of producing a liquid conductive wires. Such methods may comprise forming a body comprising an exterior and an interior; creating a channel in the body, the channel having at least a first end and at least one additional end; and emplacing an ionic liquid in the channel. As noted herein, the channel may be configured to have just a first end and a second end. Or, the channel may be part of a network, as for example having a first end that branches into a second and third end, or a first and second end that meet in a central channel and then branch to a third and fourth end. Other networks are contemplated by the disclosure herein.

The method of producing the liquid conductive wire can further include creating an inlet in the body, wherein the inlet exposes at least part of a channel disposed within the body to the exterior of the body; filling the channel with a conductive liquid via the inlet; and optionally sealing the inlet.

In some further embodiments, producing liquid conductive wires can include polymerizing a body around the liquid conductive wires. In one embodiment, in sequential steps, a polymerizable solution can be partially filled into a mold that is a negative of a desired body shape such that only a desired portion of a volume of the mold is filled. An immiscible conductive liquid can be placed onto a surface the polymerizable solution to create at least one conductive pathway. Optionally, a plurality of conductive pathways can be placed onto the surface of the polymerizable solution to create a conductive network. The polymerizable solution can be further placed into the mold to completely fill the mold. The polymerizable solution can be polymerized around the at least one conductive pathway of the conductive liquid providing a conductive liquid wire within a polymer body. In one non-limiting example the steps of partially filling the mold with the polymerizable solution and placing the conductive liquid onto the surface of the polymerizable solution can be repeated to create a layer-by-layer constructed polymer body having embedded liquid conductive wires. Interlayer interconnects can be created during the layer-by-layer construction by inserting the conductive liquid through a preceding polymerizable solution layer. In one non-limiting example, a conductive liquid can be suspended in a photopolymerizable monomer solution and the photopolymerizable monomer can be polymerized (e.g., cured by exposure to ultraviolet light), encasing the conductive liquid providing a liquid conductive wire within a photopolymer body.

Producing liquid conductive wires can include reconfiguring previously configured liquid conductive wires and/or at least one channel. For example, in certain embodiments, the method of reconfiguring the liquid conductive wire can include opening a fluidic valve in the channel and flowing a conductive liquid through the channel to create a wire. Additionally and/or alternatively, the method of reconfiguring the liquid conductive wire can include closing a fluidic valve in the channel to break liquid flow to at least part of the channel. Additionally and/or alternatively, the method of reconfiguring the liquid conductive wire can include breaking a barrier in the channel and having liquid flow to create a new or longer conductive channel. Additionally and/or alternatively, the method of reconfiguring the liquid conductive wire can include backfilling a channel with conductive liquid, wherein the backfilling allows air to diffuse out of channel. Additionally and/or alternatively, the method of reconfiguring the liquid conductive wire can include flowing a non-conductive liquid into the channel to displace the conductive liquid. Additionally and/or alternatively, the method of reconfiguring the liquid conductive wire can include flowing a non-conductive liquid into the channel to partially displace the conductive liquid (e.g., to change the resistance of the wire). Additionally and/or alternatively, the method of reconfiguring the liquid conductive wire can include deflecting a flow of the conductive liquid to form a new channel.

A variety of materials may be used for a body to contain an ionic liquid as part of a liquid wire. Suitable bodies can include an elastomer, a polymer, a copolymer, a photopolymer, a fluoropolymer, a glass, a foam, a gel, a biological material, a granular material, a metal, an alloy, a clad metal, or any combination thereof.

Also, as noted herein, the channel or body may be configured in a variety of shapes. Thus, the liquid wires disclosed herein may comprise a variety of cross-sectional shapes. The liquid wires can have a square shape, a rectangular shape, a triangular shape, a circular shape, an elliptical shape, or any suitable shape In further embodiments, for example, the body can have any two dimensional (2D) cross-section and/or three dimensional (3D) shape. Thus, the body cross section can be a rectangle, square, circle, ellipse, polygon, parallelogram, triangle, any combination thereof, or any suitable shape. In a further example, the 3D shape can be a rectangular cuboid, a sphere, a cylinder, a toroid, a hyperbolic parabola, an ellipsoid, any combination thereof, or any suitable 3D shape.

The liquid wires disclosed herein may be configured or reconfigured in a variety of sizes. Round wires can have a diameter of from about 1 nm to about 10 cm (e.g., about 50 nm to about 500 nm, about 5 cm to about 10 cm, about 500 nm to about 500 microns, about 50 mm to about 5 cm, or about 1 nm to about 100 nm). For example, round wires can have a diameter of 1 nm, 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 5 mm, 10 mm, 20 mm, 30 mm, 40 mm, 50 mm, 60 mm, 70 mm, 80 mm, 90 mm, 1 cm, 2 cm, 3 cm, 4 cm, 5 cm, 6 cm, 7 cm, 8 cm, 9 cm, 10 cm, or anywhere in between.

The liquid conductive wire can be at least partially contained within a channel, wherein the channel can be fashioned as a plurality of channels, a network of channels, a reservoir, an inlet, an outlet, a source, a drain, or any combination thereof. The channel can be contained within the body. The channel or plurality of channels can be disposed on a surface of the body such that the liquid conductive wire can be exposed to any environment in which the body can be placed.

As noted above, a variety of materials may be used as ionic liquids. In some examples, ionic liquids have a boiling point sufficiently high such that evaporation is negligible at room temperature.

The channel created in the body can have at least a first end and a second end. In some examples, a 3D body can have a first port disposed on a surface of the body, wherein the first port can be an inlet. The inlet can expose at least part of a channel disposed within the body to the exterior of the body, enabling filling the channel with a conductive ionic liquid. The inlet can optionally be sealed after filling the channel with the ionic liquid. Sealing the inlet can include gluing, pinching, clamping, recasting (e.g., melting the inlet material and allowing the material to solidify in a sealed state), or attaching an electrical lead. Optionally, the 3D body can have a second port disposed on a surface of the body, wherein the second port can be an outlet. The outlet can expose at least part of a channel disposed within the body to the exterior of the body, enabling draining the channel with a conductive ionic liquid. The outlet can optionally be opened after filling the channel with the ionic liquid to drain the channel. Opening the outlet can include dissolving glue, unpinching, unclamping, melting, piercing, or removing an electrical lead.

In some embodiments, a plurality of channels can be formed in a body to create a network of channels. The channels can intersect in 2D and/or in 3D. For example, the channels can intersect at any suitable angle (e.g., about 1° to about 359°, or anywhere in between) in a single plane. In some further examples, the channels can intersect across a plurality of planes (i.e., the channels can be formed into interplanar interconnects). In a still further example, the channels can intersect within a single plane and across a plurality of planes. In still further examples, the channel can have a 3D shape. For example, the channel can be a coil, a toroid, an arc, or a helix.

In some embodiments, and as described in more detail herein, a plurality of bodies can be combined to form a system. Any suitable system design can be accomplished by combining the plurality of bodies.

The method of producing a liquid conductive wire, creating an inlet or an outlet, creating channels and otherwise preparing a body for implementation of liquid conductive wires can further include the use of at least one of photolithography, wet etching, reactive ion etching, soft lithography, two-photon lithography, 3-D printing, or forming the channel around a sacrificial template.

V. Systems and Methods of Using Liquid Conductive Wires

Also disclosed herein are systems comprising liquid conductive wires, wherein liquid wire is incorporated into a component of the system. Suitable system components that may comprise an ionic wire may include, but are not limited to, any one of a device, an electronic component, a robot, or a chemical compound (e.g., a medicament). In some examples, liquid wire can be part of a soft robotic device, a transparent liquid antenna, a transmitter, a self-healing fuse, a neuromodulator, a dynamically reconfigurable electronic device, a sensor, a pressure-driven circuit breaker, a wearable electronic device, a transparent electronic device, a contact lens, an intraocular lens, a display device, or a heating and cooling system. In some examples, conductive ionic liquid wires can be disposed within and/or onto a flexible substrate to provide a flexible electronic device. The flexible electronic device can be resistor, a capacitor, a diode, a transistor, a memristor, a thermistor, a varistor, and/or a triode. In some examples, a capacitor can be formed by disposing a dielectric material between a first liquid conductive wire and a second liquid conductive wire. In some embodiments, a conductive liquid wire can be repeatedly bent or flexed without breaking.

For example, a conductive liquid wire can be used in a soft robot as interconnect circuitry or a hydraulic network, wherein the liquid conductive wires can function simultaneously as electronic conductor and hydraulic fluid. The soft robot can be produced with a transparent elastomer to create a transparent soft robot. Optionally, an ionic liquid having a matching refractive index as the elastomer can provide a fully transparent soft robot, wherein a body of the soft robot and the interconnect circuitry/hydraulic fluid both appear transparent.

In some non-limiting embodiments, conductive liquid wires can be employed in soft contact lenses. Employing conductive liquid wires in contact lenses can provide dynamically focusable contact lenses. Elastomers used to provide contact lenses and ionic liquid conductive wires can have matching refractive indices to provide transparent contact lenses that can be electronically focused. Ionic liquid conductive wires embedded in contact lenses can additionally survive repeated bending associated with implanting the contact lenses onto an eye. Additionally, conductive liquid wires can be used in implantable intraocular corrective lenses providing dynamically adjustable implanted corrective lenses.

In further embodiments, conductive liquid wires can be employed in sensors as device interconnect wiring. Additionally, conductive liquid wires can be employed as a sensor. For example, the conductive liquid wire can be employed in a flexible material to indicate bending. A sensory system can be designed to lose electrical current flow when the flexible material is bent past a predetermined angle, wherein flow of the conductive liquid wires is severed.

In yet other embodiments, conductive liquid wires can be employed in information displays. Employing conductive liquid wires in displays can provide flexible displays. Display substrates can be elastomers eliminating use of indium-tin oxide (ITO) coated glass substrates and ITO coated poly(ethylene terephthalate) (PET) as substrates for rigid and flexible displays, light emitting diodes (LEDs), organic light emitting diodes (OLEDs) and/or polymeric light emitting diodes (PLEDs).

In some embodiments, conductive liquid wires can be employed in biological and/or pharmaceutical implantable devices. For example, conductive liquid wires can provide a non-toxic alternative to metals or solid oxides for circuitry in implantable devices. In some embodiments, neurostimulators can include ionic liquid conductive wires ensuring safe implantation.

VI. Examples

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 shows a poly(dimethylsiloxane) (PDMS) body 110 placed on a substrate bearing a hand drawn "X" 120 to illustrate transparency of a liquid wire containing system. A channel 130 (outlined with white dashed lines) is disposed within the PDMS body and filled with a conductive ionic liquid. The PDMS body and conductive ionic liquid have similar refractive indices (e.g., a refractive index of the liquid conductive wire and a refractive index of the body are within 10% of each other) providing a transparent system.

FIG. 2A shows a poly(dimethylsiloxane) (PDMS) substrate. Microfluidic channels can be formed in the PDMS and filled with an ionic fluid thus creating flexible liquid wires. FIG. 2B shows a transparent liquid wire 130 created by matching refractive indices of the ionic liquid and PDMS substrate. The electrode is substantially transparent and as such, is outlined by (i.e., contained within) the white dashed lines.

In some non-limiting examples, described herein is a system including the liquid conductive wire and a body, wherein the liquid conductive wire includes a first end, at least one additional end, and an ionic liquid, wherein the liquid conductive wire is configured to transfer electrical current/voltage from the first end to at least the one additional end and vice versa. In some cases, the system is one of a device, an electronic component (e.g., at least one of a resistor, a capacitor, a diode, a transistor, a memristor, a thermistor, a varistor, or a triode), a robot, a medicament, a chemical compound, any suitable system that can benefit from incorporating liquid conductive wires, or any combination thereof. In some non-limiting examples, the liquid conductive wire is configured to be used as interconnect circuitry of a soft robotic device, a hydraulic network of a soft robotic device, a transparent liquid antenna, a transmitter, a self-healing fuse, a neuromodulator, a dynamically reconfigurable electronic device, a sensor, a pressure-driven circuit breaker, a wearable electronic device, a transparent electronic device, a contact lens, an intraocular lens, a reflective or backlit display device, a heating and cooling system, or any combination thereof. In some aspects, the liquid conductive wire can function simultaneously as electronic conductor and hydraulic fluid.

In some further examples, the system is provided by employing the liquid wire within a flexible substrate to provide a flexible electronic device, and/or onto a flexible substrate to provide a flexible electronic device.

In some cases, the system is provided wherein the liquid conductive wire and the body are of a similar refractive index, providing a system that is substantially translucent or substantially transparent.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A method of producing a liquid conductive wire, comprising:
    a. forming a body comprising an exterior and an interior;
    b. creating a channel in the body, the channel having at least a first end and at least one additional end; and
    c. emplacing an ionic liquid in the channel to produce the liquid conductive wire,
    wherein the ionic liquid and the body comprise refractive indices sufficient to provide a transparent liquid conductive wire, and
    wherein the liquid conductive wire is configured to transfer electrical current/voltage from the first end to the one additional end and vice versa.

2. The method of claim 1, further comprising:
    a. creating an inlet in the body, wherein the inlet exposes at least part of the channel disposed within the body to the exterior of the body;
    b. at least partly filling the channel with a conductive liquid via the inlet; and
    c. sealing the inlet.

3. The method of claim 1, wherein producing the liquid conductive wire further comprises the steps of:
    a. obtaining a mold having a desired body shape;
    b. filling the mold at least partially with a polymerizable solution;
    c. emplacing the ionic liquid into the polymerizable solution to create at least one conductive pathway;
    d. filling the mold completely with the polymerizable solution; and
    e. polymerizing the polymerizable solution to form the body around the ionic liquid to create the liquid conductive wire embedded within the body.

4. The method of claim 1, wherein producing the liquid conductive wire comprises reconfiguring at least one previously configured liquid conductive wire and/or at least one channel.

5. The method of claim 4, wherein reconfiguring at least the one previously configured liquid conductive wire comprises at least one of:
    a. opening a fluidic valve in the channel and flowing a conductive liquid through the channel to create a wire;
    b. closing a fluidic valve in the channel to break liquid flow to at least part of the channel;
    c. breaking a barrier in the channel and having liquid flow to create a new or longer conductive channel;
    d. backfilling a channel with conductive liquid, wherein the backfilling allows air to diffuse out of channel;
    e. flowing a non-conductive liquid into the channel to displace the conductive liquid;
    f. flowing a non-conductive liquid into the channel to partially displace the conductive liquid; or
    g. deflecting a flow of the conductive liquid to form a new channel.

6. The method of claim 4, wherein the reconfiguring provides a change in electrical current flow of the liquid conductive wire.

7. The method of claim 6, wherein the change in electrical current flow of the liquid conductive wire provides a sensory system.

8. The method of claim 1, wherein creating the channel comprises using of at least one of photolithography, wet etching, reactive ion etching, soft lithography, two-photon lithography, 3-D printing, forming the channel around a sacrificial template, milling, micromilling, embossing, extruding, vacuforming, injection molding or a damascene process.

9. The method of claim 2, wherein creating an inlet comprises using at least one of photolithography, wet etching, reactive ion etching, soft lithography, two-photon lithography, or forming the inlet opening around a sacrificial template.

10. A method of producing a liquid conductive wire, comprising:
   a. obtaining a mold having a desired body shape;
   b. filling the mold at least partially with a polymerizable solution;
   c. emplacing an immiscible conductive solution into the polymerizable solution to create at least one conductive pathway;
   d. filling the mold completely with the polymerizable solution; and
   e. polymerizing the polymerizable solution to form a body around the immiscible conductive solution to create a liquid conductive wire embedded within the body,
   wherein the liquid conductive wire is configured to transfer electrical current/voltage from a first end of the body to another end of the body and vice versa.

11. A method of producing a liquid conductive wire, comprising:
   a. forming a body comprising an exterior and an interior;
   b. creating a channel in the body, the channel having at least a first end and at least one additional end; and
   c. emplacing an ionic liquid in the channel; and
   d. reconfiguring at least one previously configured liquid conductive wire and/or at least one channel, wherein reconfiguring the at least one previously configured liquid conductive wire comprises at least one of:
   i. opening a fluidic valve in the channel and flowing a conductive liquid through the channel to create a wire;
   ii. closing a fluidic valve in the channel to break liquid flow to at least part of the channel;
   iii. breaking a barrier in the channel and having liquid flow to create a new or longer conductive channel;
   iv. backfilling a channel with conductive liquid, wherein the backfilling allows air to diffuse out of channel;
   v. flowing a non-conductive liquid into the channel to displace the conductive liquid;
   vi. flowing a non-conductive liquid into the channel to partially displace the conductive liquid; or
   vii. deflecting a flow of the conductive liquid to form a new channel.

* * * * *